(12) United States Patent
Seetharaman

(10) Patent No.: US 10,129,094 B1
(45) Date of Patent: Nov. 13, 2018

(54) VARIABLE COMPUTING CAPACITY

(71) Applicant: Amazon Technologies, Inc., Reno, NV (US)

(72) Inventor: Karthigeyan Seetharaman, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 285 days.

(21) Appl. No.: 14/209,971

(22) Filed: Mar. 13, 2014

(51) Int. Cl.
*G06F 15/173* (2006.01)
*H04L 12/24* (2006.01)
*H04L 12/911* (2013.01)

(52) U.S. Cl.
CPC .............. *H04L 41/18* (2013.01); *H04L 47/70* (2013.01)

(58) Field of Classification Search
CPC . G06F 9/5061; G06F 9/5077; G06Q 30/0283; H04L 41/18; H04L 47/70
USPC ........................................................ 709/226
See application file for complete search history.

(56) References Cited

U.S. PATENT DOCUMENTS

| | | | | |
|---|---|---|---|---|
| 8,316,131 B2 * | 11/2012 | Sheets | .................. | G06F 9/5061 709/226 |
| 8,694,400 B1 * | 4/2014 | Certain | .................. | G06Q 30/08 705/26.3 |
| 2007/0245113 A1 * | 10/2007 | Shinozaki | ............. | G06F 3/0608 711/170 |
| 2009/0265712 A1 * | 10/2009 | Herington | ............. | G06F 9/5077 718/103 |
| 2012/0011340 A1 * | 1/2012 | Flynn | .................. | G06F 12/0246 711/171 |
| 2012/0041899 A1 * | 2/2012 | Greene | .................. | G06Q 10/04 705/400 |
| 2014/0279320 A1 * | 9/2014 | Scheinblum | ............. | G06F 9/50 705/34 |

OTHER PUBLICATIONS

Introduction to Cloud Computing William Woovsluys, James Broberg and Rajkumar Buyya pp. 1-40, published 2011.*

* cited by examiner

*Primary Examiner* — Tauqir Hussain
(74) *Attorney, Agent, or Firm* — Baker & Hostetler LLP

(57) ABSTRACT

In a multi-tenant web services platform, a request to allocate a subset of the customer's reserved computing resource capacity as a variable resource is received from a customer. The platform is allowed to modify one or more parameters of the subset in accordance with at least one criterion without modifying the remaining portion of the customer's reserved computing resource capacity. The subset is analyzed in accordance with the at least one criterion. The parameters of the portion of the subset are modified based on the analysis of the subset.

20 Claims, 12 Drawing Sheets

FIG. 9

VARIABLE COMPUTING CAPACITY

BACKGROUND

A data center is a facility that houses computer systems and various networking, storage, and other related components. Data centers may, for example, provide computing services to businesses and individuals as a remote computing service or to provide "software as a service" (e.g., cloud computing). To facilitate utilization of data center resources, virtualization technologies may allow a single physical computing machine to host one or more instances of virtual machines that appear and operate as independent computer machines to a connected computer user. With virtualization, the single physical computing device can create, maintain, or delete virtual machines in a dynamic manner.

Some virtualization technologies are capable of providing virtual resources that span two or more physical resources, such as a single virtual machine with multiple virtual processors that span multiple distinct physical computing systems. As another example, virtualization technologies may allow data storage hardware to be shared among multiple users by providing each user with a virtualized data store that may be distributed across multiple data storage devices, with each such virtualized data store acting as a distinct logical data store that provides users with the illusion that they are the sole operators and administrators of the data storage resource.

In many environments, operators of data centers that implement different types of virtualized computing, storage, and/or other network-accessible resources may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors, and with various installed software applications, runtimes, and the like.

BRIEF DESCRIPTION OF DRAWINGS

Throughout the drawings, reference numbers may be reused to indicate correspondence between referenced elements. The drawings are provided to illustrate example embodiments described herein and are not intended to limit the scope of the disclosure:

FIG. 9 is a diagram illustrating an example user interface in accordance with the present disclosure;

DETAILED DESCRIPTION

Figure 1:
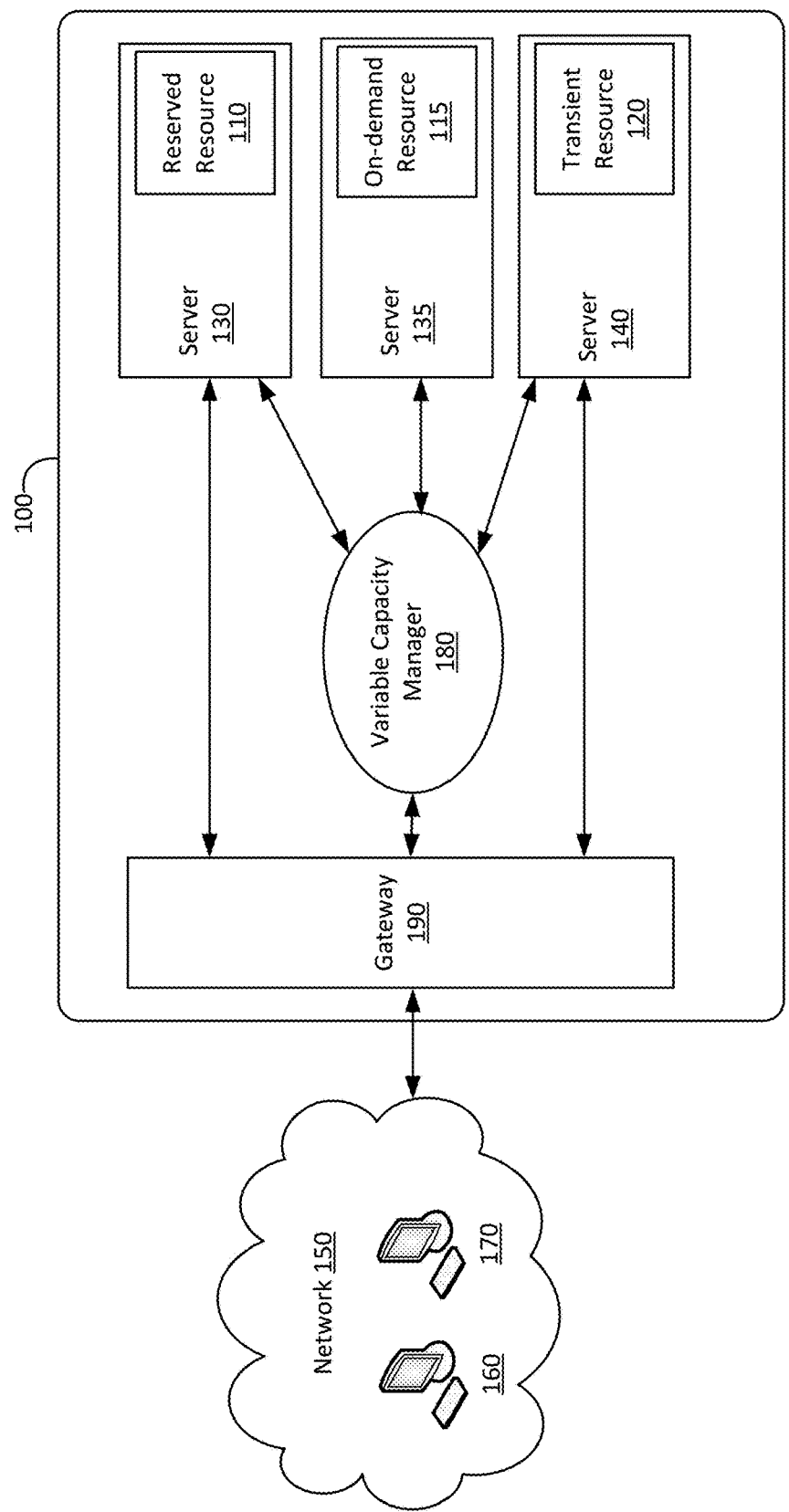
FIG. 1 is a diagram illustrating a mechanism for allocating resources in accordance with the present disclosure.

A provider network, such as a data center, may offer computing resources, such as a reserved resource and a transient resource. A resource may refer to various types of computing resources that may be provided by a provider network, such as a virtual computing instance. A reserved resource may provide the customer with the ability to reserve a number of a specific type and configuration of resource for a fixed term, such as one year or three years. A transient resource may refer to an allocation of a resource using a market price-based policy, where the customer may specify the maximum price per unit of time that the customer is willing to pay for a resource. If the customer's maximum price exceeds a dynamic price determined at least in part by supply and demand, then the resource may be provided to the customer. Other types of resources may be offered by the provider network. In addition to a type of resource, the customer may be allowed to specify a particular configuration for the resource, such as size, platform, location, and the like. In many cases, the customer may estimate the numbers and configurations of resources and resource types to best suit the customer's needs according to the technical specifications of the resources and resource types. However, not all customers may have sufficient information or experience to accurately or efficiently estimate the numbers and configurations of resources that are required to meet their needs. Furthermore, customers may acquire resources that accommodate their needs during peak usage, but the acquired resources may not be fully utilized during off-peak time periods.

In various embodiments described further in this disclosure, customers may be provided with the ability to submit a request or bid for resources with an initial quantity of resources and the configurations of the resources, and allocate a percentage (e.g., from 0% to 100%) of the resources for continuous rebalancing in order to provide optimization in one or more areas, such as pricing or other factors. For example, a customer may be provided the ability to allocate a portion of the customer's reserved resources to be available for rebalancing or reconfiguration by the provider network. Rebalancing or reconfiguration may comprise any one of a number of changes that may be made to a customer's reserved computing capacity, such as the resource type, and may be referred to as variability. Such a request may be referred to herein as a request for reserved capacity with variability, variable reserved capacity, or variable reserved resource. Other terms may be used in place of variable or variability, to convey a similar effect, such as modifiable or convertible, generally referring to the possibility of changing some or all of the qualities or characteristics of a resource. The request may also include a desired pricing level that the customer is willing to pay to fulfill the request. Customers may provide other parameters to further describe the customer's computing needs and to further optimize fulfillment of the request. In this way, a customer need not be fully committed to a particular configuration or quantity of resource in terms of specific technical characteristics or configurations when making a request. The customer may also be provided pricing benefits from allocating a portion of the customer's reserved resources as variable. Further details will now be described.

FIG. 1 is a diagram illustrating a system 100 including a framework for submitting requests for variable reserved resources in accordance with the present disclosure. In FIG. 1, system 100 may include a reserved resource 110, an on-demand resource 115, and a transient resource 120 that may execute, for example, on one or more server computers 130, 135, and 140, respectively. It will be appreciated that some embodiments may involve additional resources of various types that may be instantiated on additional server computers.

FIG. 1 also illustrates a public network 150 that may include one or more computers, such as computers 160 and 170. According to one embodiment, resources 110, 115 and 120 may be configured to provide computing services to a computer user (not shown) of public network 150 via gateway 190 and computers 160 and 170. For example, reserved resource 110 may provide a set of remote access enterprise applications to a group of users who may, for example, be employees of an enterprise customer.

A user at computer 160 or 170 may send a request to a variable capacity manager 180 for analyzing and managing the fulfillment of variable capacity requests. In some embodiments, a variable capacity request may be received directly from the user at computer 160 or 170. In response to receipt of a variable capacity request, variable capacity manager 180 may log the request and provide updates as to the status of the variable capacity request. The variable capacity manager 180 may communicate with other services to facilitate: (1) processing of the variable capacity request, (2) requesting resources to fulfill the variable capacity request, and (3) allocation of resources necessary to fulfill the variable capacity request. The variable capacity manager 180 may, for example, provide an interface for facilitating submission of the variable capacity request. The variable capacity manager 180 may further provide an interface for viewing the status of the variable capacity request and modifying or cancelling the variable capacity request.

Various aspects of the disclosure are now described with regard to certain examples and embodiments, which are intended to illustrate but not to limit the disclosure. It should be appreciated that the subject matter presented herein may be implemented as a computer process, a computer-controlled apparatus or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Networks established by or on behalf of an entity, such as a company or an organization, to provide one or more services (such as various types of cloud-based computing or storage) accessible via the Internet and/or other networks to a distributed set of clients may be termed provider networks. Such a provider network may include one or more data centers hosting various resource pools, such as collections of physical and/or virtualized computer servers, storage devices, networking equipment, and the like, that may be used to implement and distribute the infrastructure and services offered by the provider network. The resources may in some embodiments be offered to clients in units called instances, such as virtual or physical compute instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages, such as Ruby, Perl, Python, C, C++, and the like or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Figure 2:
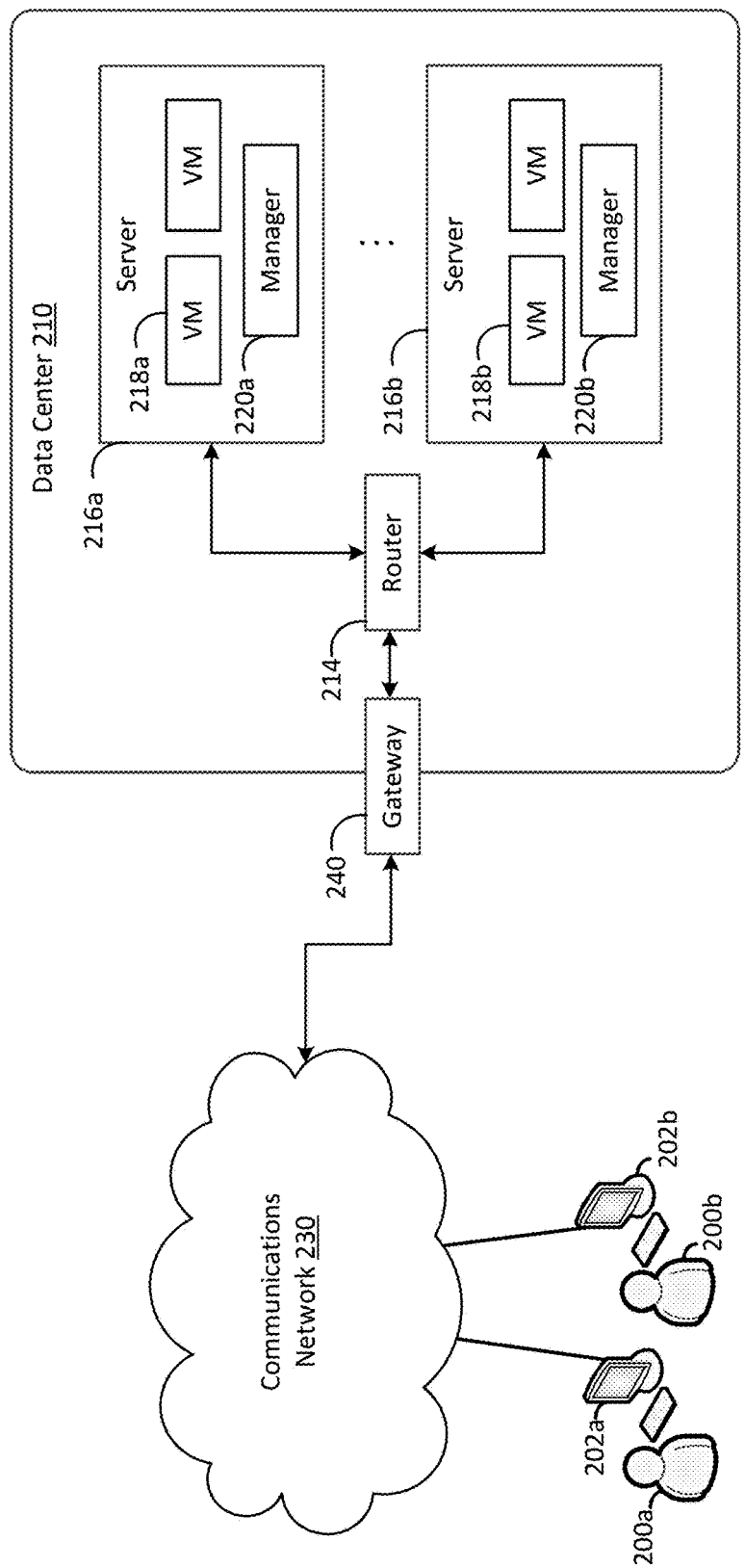
FIG. 2 is a diagram illustrating an example computing system that may be used in some embodiments.

FIG. 2 illustrates an example computing environment in which the embodiments described herein may be implemented. FIG. 2 is a diagram schematically illustrating an example of a data center 210 that can provide computing resources to users 200a and 200b (which may be referred herein singularly as "a user 200" or in the plural as "the users 200") via user computers 202a and 202b (which may be referred herein singularly as "a computer 202" or in the plural as "the computers 202") via a communications network 230. Data center 210 may be configured to provide computing resources for executing applications on a permanent or an as-needed basis. The computing resources provided by data center 210 may include various types of resources, such as data processing resources, data storage resources, data communication resources, and the like. Each type of computing resource may be general-purpose or may be available in a number of specific configurations. For example, data processing resources may be available as virtual machine instances. The instances may be configured to execute applications, including Web servers, application servers, media servers, database servers, and the like. Data storage resources may include file storage devices, block storage devices, and the like.

Each type or configuration of computing resource may be available in different sizes, such as large resources, consisting of many processors, large amounts of memory, and/or large storage capacity, and small resources consisting of fewer processors, smaller amounts of memory, and/or smaller storage capacity. Customers may choose to allocate a number of small processing resources as Web servers and/or one large processing resource as a database server, for example.

Data center 210 may include servers 216a and 216b (which may be referred herein singularly as "a server 216" or in the plural as "the servers 216") that provide computing resources available as virtual machine instances 218a and 218b (which may be referred herein singularly as "a virtual machine instance 218" or in the plural as "the virtual machine instances 218"). The virtual machine instances 218 may be configured to execute applications, including Web servers, application servers, media servers, database servers, and the like. Other resources that may be provided include data storage resources (not shown) and may include file storage devices, block storage devices, and the like.

The availability of virtualization technologies for computing hardware has provided benefits for providing large scale computing resources for customers and allowing computing resources to be efficiently and securely shared between multiple customers. For example, virtualization technologies such as those provided by VMware or other virtualization systems may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 2, communications network 230 may, for example, be a publicly accessible network of linked networks and possibly operated by various distinct parties, such as the Internet. In other embodiments, communications network 230 may be a private network, such as, for example, a corporate or university network that is wholly or partially inaccessible to non-privileged users. In still other embodiments, communications network 230 may include one or more private networks with access to and/or from the Internet.

Communication network 230 may provide access to computers 202. Computers 202 may be computers utilized by customers 200 or other customers of data center 210. For instance, user computer 202a or 202b may be a server, a desktop or laptop personal computer, a tablet computer, a wireless telephone, a personal digital assistant (PDA), an e-book reader, a game console, a set-top box, or any other computing device capable of accessing data center 210. User computer 202a or 202b may connect directly to the Internet (e.g., via a cable modem or a Digital Subscriber Line (DSL)). Although only two user computers 202a and 202b are depicted, it should be appreciated that there may be multiple user computers.

Computers 202 may also be utilized to configure aspects of the computing resources provided by data center 210. In this regard, data center 210 might provide a Web interface through which aspects of its operation may be configured through the use of a Web browser application program executing on user computer 202. Alternatively, a stand-alone application program executing on user computer 202 might access an application programming interface (API) exposed by data center 210 for performing the configuration operations. Other mechanisms for configuring the operation of the data center 210, including deploying updates to an application, might also be utilized.

Servers 216a and 216b (which may be referred herein singularly as "a server 216" or in the plural as "the servers 216"), shown in FIG. 2, may be standard servers configured appropriately for providing the computing resources described above and may provide computing resources for executing one or more applications. In one embodiment, the computing resources may be virtual machine instances 218. In the example of virtual machine instances, each of the servers 216 may be configured to execute an instance manager 220a or 220b (which may be referred herein singularly as "an instance manager 220" or in the plural as "the instance managers 220") capable of executing the virtual machine instances. The instance managers 220 may be a virtual machine monitor (VMM) or another type of program configured to enable the execution of virtual machine instances 218 on servers 216, for example. As discussed above, each of the virtual machine instances 218 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 210 shown in FIG. 2, a router 214 may be utilized to interconnect the servers 216a and 216b. Router 214 may also be connected to gateway 240, which is connected to communications network 230. Router 214 may manage communications within networks in data center 210, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 2 has been greatly simplified and that many more networks and networking devices may be utilized to interconnect the various computing systems disclosed herein. These network topologies and devices should be apparent to those skilled in the art.

It should also be appreciated that data center 210 described in FIG. 2 is merely illustrative and that other implementations might be utilized. Additionally, it should be appreciated that the functionality disclosed herein might be implemented in software, hardware, or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The capacity of purchased computing resources provided by data center 210 can be scaled in response to demand. In this regard, scaling refers to the process of instantiating (which may also be referred to herein as launching" or "creating) or terminating (which may also be referred to herein as de-scaling) instances of computing resources in response to demand. In this manner, the capacity of resources purchased by a customer of data center 210 can be scaled on-demand.

Auto scaling is one mechanism for scaling computing resources in response to increases or lulls in demand for the resources. Auto scaling allows customers of data center 210 to configure data center 210 to scale their purchased computing resources according to conditions defined by the customer. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand. The mechanisms disclosed herein for launching virtual machine instances might be utilized when instances are manually launched by a customer or when instances are launched by an auto scaling component in data center 210.

Data center 210 may also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts, and/or other types of code to be executed in new instances, and provide cache warming logic specifying how an application cache should be prepared and other types of information. The deployment component utilizes the customer-provided configuration and cache warming logic to launch, configure and prime new instances of computing resources.

Figure 3:
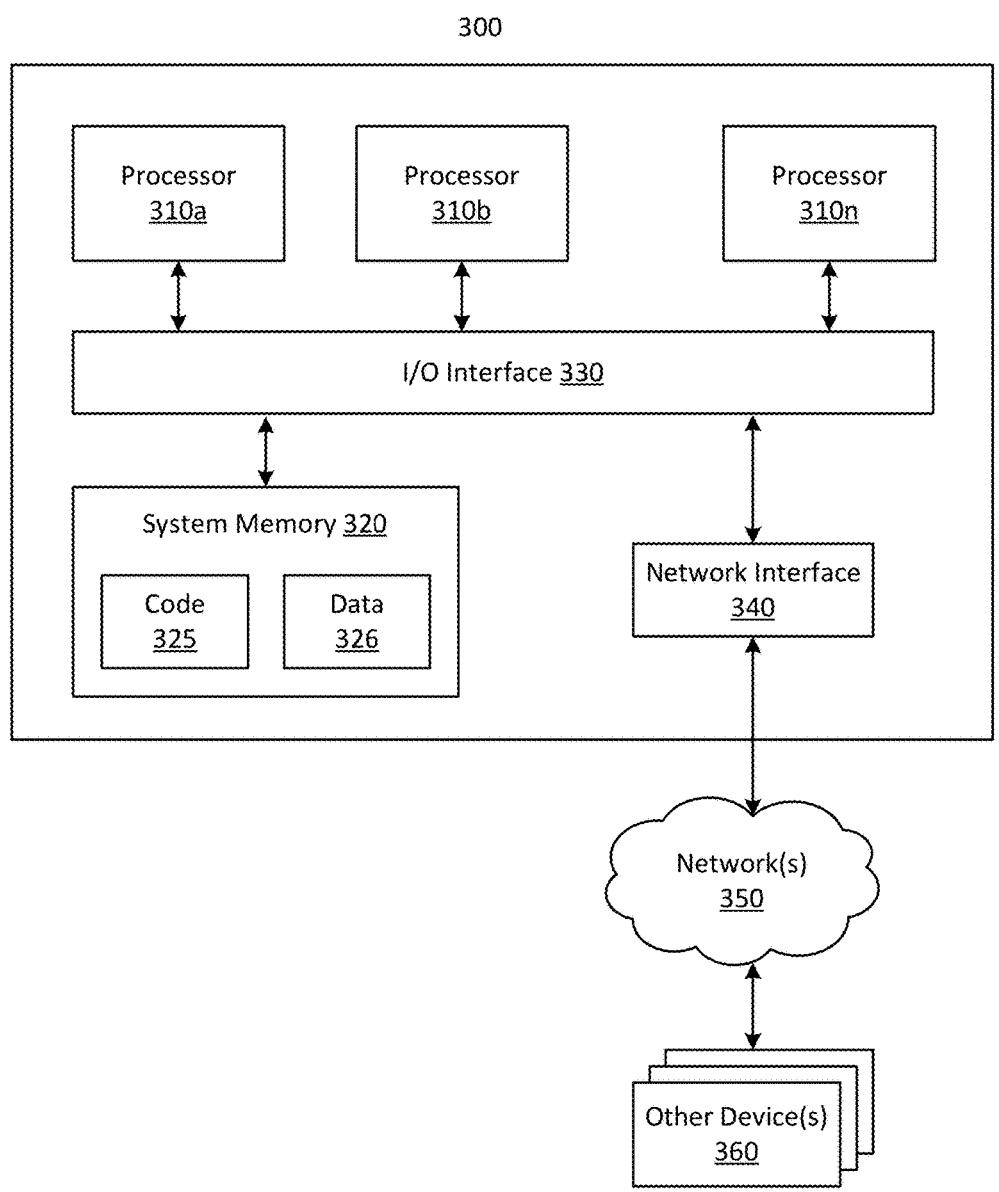
FIG. 3 is a diagram illustrating an example computing system that may be used in some embodiments.

In at least some embodiments, a server that implements a portion or all of one or more of the technologies described herein, including the techniques to implement the functionality of a variable capacity manager 180 may include a general-purpose computer system that includes or is configured to access one or more computer-accessible media. FIG. 3 illustrates such a general-purpose computing device 300. In the illustrated embodiment, computing device 300 includes one or more processors 310a, 310b, and/or 310n (which may be referred herein singularly as "a processor 310" or in the plural as "the processors 310") coupled to a system memory 320 via an input/output (I/O) interface 330. Computing device 300 further includes a network interface 340 coupled to I/O interface 330.

In various embodiments, computing device 300 may be a uniprocessor system including one processor 310 or a multiprocessor system including several processors 310 (e.g., two, four, eight, or another suitable number). Processors 310 may be any suitable processors capable of executing instructions. For example, in various embodiments, processors 310 may be general-purpose or embedded processors implementing any of a variety of instruction set architectures (ISAs), such as the x86, PowerPC, SPARC, or MIPS ISAs, or any other suitable ISA. In multiprocessor systems, each of processors 310 may commonly, but not necessarily, implement the same ISA.

System memory 320 may be configured to store instructions and data accessible by processor(s) 310. In various embodiments, system memory 320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 320 as code 325 and data 326.

In one embodiment, I/O interface 330 may be configured to coordinate I/O traffic between processor 310, system memory 320, and any peripheral devices in the device, including network interface 340 or other peripheral interfaces. In some embodiments, I/O interface 330 may perform any necessary protocol, timing, or other data transformations to convert data signals from one component (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. Also, in some embodiments some or all of the functionality of I/O interface 330, such as an interface to system memory 320, may be incorporated directly into processor 310.

Network interface 340 may be configured to allow data to be exchanged between computing device 300 and other device or devices 360 attached to a network or networks 350, such as other computer systems or devices as illustrated in FIGS. 1 through 3, for example. In various embodiments, network interface 340 may support communication via any suitable wired or wireless general data networks, such as types of Ethernet networks, for example. Additionally, network interface 340 may support communication via telecommunications/telephony networks such as analog voice networks or digital fiber communications networks, via storage area networks such as Fibre Channel SANs or via any other suitable type of network and/or protocol.

In some embodiments, system memory 320 may be one embodiment of a computer-accessible medium configured to store program instructions and data as described above for FIGS. 1 and 2 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 300 via I/O interface 330. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 300 as system memory 320 or another type of memory. Further, a computer-accessible medium may include transmission media or signals such as electrical, electromagnetic or digital signals, conveyed via a communication medium such as a network and/or a wireless link, such as may be implemented via network interface 340. Portions or all of multiple computing devices such as those illustrated in FIG. 3 may be used to implement the described functionality in various embodiments; for example, software components running on a variety of different devices and servers may collaborate to provide the functionality. In some embodiments, portions of the described functionality may be implemented using storage devices, network devices or special purpose computer systems, in addition to or instead of being implemented using general purpose computer systems. The term "computing device," as used herein, refers to at least all these types of devices and is not limited to these types of devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors and with various installed software applications, runtimes, and the like. Instances may further be available in specific availability zones, representing a data center or other geographic location of the underlying computing hardware, for example.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

The provider network may make instances available on-demand, allowing a customer to select a number of instances of a specific type and configuration (e.g. size, platform, tenancy, availability zone, and the like) and quickly launch the instances for deployment. On-demand resources may further be added or removed as needed, either manually or automatically through auto scaling, as demand for or capacity requirements changes over time. The customer may incur ongoing usage costs related to the customer's on-demand resources, based on the number of hours of operation and/or the actual resources utilized, for example.

The computing resource provider may also make reserved resources available to the customer. Reserved resources may provide the customer with the ability to reserve a number of a specific type and configuration of instances for a fixed term, such as one year or three years, for a low, upfront cost in exchange for reduced hourly or other usage costs, for example, if and when the instances are launched. This may allow the customer to defer costs related to scaling up the deployed application in response to increase in demand, while ensuring that the right resources will be available when needed. While reserved resources provide customers with reliable, stand-by capacity for scaling of their application, purchasing reserved resources may also lock the customer into a specific number, type, and/or configuration of computing resource in a specific availability zone for a longer period than desired. If the technical architecture or needs of the application change, the customer may not be able to realize a return on the customer's investment in the reserved resources.

Operators of such provider networks may in some instances implement a flexible set of resource reservation, control, and access interfaces for their clients. For example, a resource manager of the provider network may implement a programmatic resource reservation interface (e.g., via a Web site or a set of Web pages) that allows clients to learn about, select, purchase access to, and/or reserve resource instances. In some embodiments discussed below where an entity such as a resource manager or a pricing optimizer is described as implementing one or more programmatic interfaces such as a Web page or an API, an interface manager subcomponent of that entity may be responsible for the interface-related functionality. In many embodiments equivalent interface-related functionality may be implemented by a separate or standalone interface manager, external to the resource manager and the pricing optimizer. Such an interface may include capabilities to allow browsing of a resource catalog, provide details and specifications of the different types or sizes of resources supported, the different reservation types or modes supported, pricing models, and so on.

The provider network may support several different purchasing modes (which may also be referred to herein as reservation modes) corresponding to some of the instance types described above. For example, the provider network may support long-term reservations, on-demand resource allocations, or spot-price-based resource allocations. Using the long-term reservation mode, a client may make a low, one-time, upfront payment for a resource instance, reserve it for a specified duration, such as a one- or three-year term, and pay a low hourly rate for the instance; the client would be assured of having the reserved resource available for the term of the reservation. Using the on-demand mode, a client could pay for capacity by the hour (or some appropriate time unit), without any long-term commitments or upfront payments. In the spot-price mode, a client could specify the maximum price per unit of time that it is willing to pay for a particular type of resource, and if the client's maximum price exceeded a dynamic spot price determined at least in part by supply and demand, then that type of resource would be provided to the client. In some embodiments, dynamically resizable pools of resource instances may be set aside for the different reservation types or modes—e.g., long-term reserved resources may be allocated from one pool, on-demand resources from another, and so on. During periods when the supply of the requested resource type exceeded the demand, the spot price may become significantly lower than the price for the on-demand mode. In some implementations, if the spot price increases beyond the maximum bid specified by a client, a resource allocation may be interrupted—i.e., a resource instance that was previously allocated to the client may be reclaimed by the resource manager and may be allocated to some other client that is willing to pay a higher price. Other purchasing modes or combinations of modes may be implemented by the resource manager in some embodiments.

Figure 4:
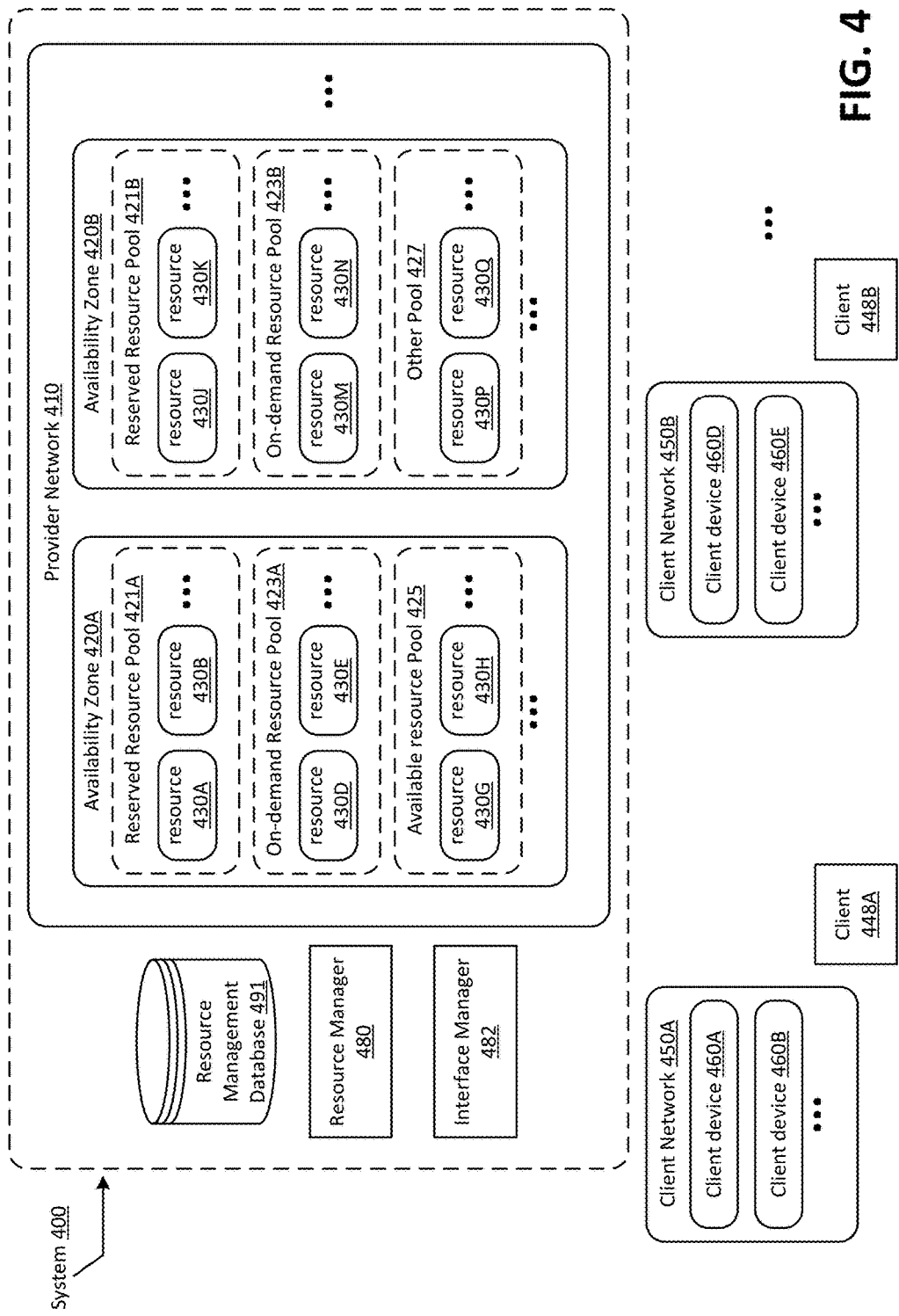
FIG. 4 is a diagram illustrating a system for allocating resources in accordance with the present disclosure.

FIG. 4 illustrates an example system environment for providing resources, such as instances, according to at least some embodiments. The system 400 may include a provider network 410 comprising a plurality of resources 430 (which may be referred herein singularly as "a resource instance 430" or in the plural as "the resources 430"), such as resources 430A, 430B, 430D, 430E, 430G and 430H in one availability zone 420A and resources 430J, 430K, 430M, 430N, 430P and 430Q in a different availability zone 420B. The various resources 430 in the availability zones 420A and 420B (which may be referred herein singularly as "an availability zone 420" or in the plural as "the availability zones 420") may be reserved and/or allocated for use by clients (or potential clients) such as clients 448A and 448B (which may be referred herein singularly as "a client 448" or in the plural as "the clients 448"). In the illustrated embodiment, system 400 includes a resource manager 480 and an interface manager 482. As noted earlier, in some embodiments the functionality of the interface manager 482 may be implemented by a subcomponent of the resource manager 480.

The interface manager 482 may in some embodiments implement one or more programmatic interfaces allowing clients 448 to search for, browse, reserve, and acquire resources 430 to obtain various types of services, e.g., to run and/or access various applications. In the illustrated embodiment, at a given point in time, some or all of the resources 430 may be assigned to resource pools, such as reserved resource pools 421A or 421B, on-demand resource pools 423A or 423B, available resource pool 425, or other pools, such as other pool 427.

In some embodiments a given pool, such as available resource pool 425, may itself contain its own sub-pools, e.g., based on the modes of resource reservation and allocation supported. Each pool (or sub-pool) may have an associated pricing policy for its resources, as well as other properties, such as interruptibility settings, for the resources that happen to be assigned to the pool or sub-pool. The pools may represent logical collections or aggregations, so that, for example, the presence of two resources in the same pool or sub-pool may not necessarily imply anything about the physical location of the hardware used for the two resources. Although the resources 430 illustrated in FIG. 4 are shown as belonging to availability zones 420, in other embodiments the provider network 410 may be organized differently, e.g., in some embodiments, availability zones 420 may not be implemented. Availability zones 420 may be grouped into geographic regions (not shown in FIG. 4) in some embodiments. Resource pools may be implemented within availability zones in some implementations (e.g., each availability zone may have its own reserved resource pool); while in other implementations a resource pool or sub-pool may span multiple availability zones.

Figure 5:
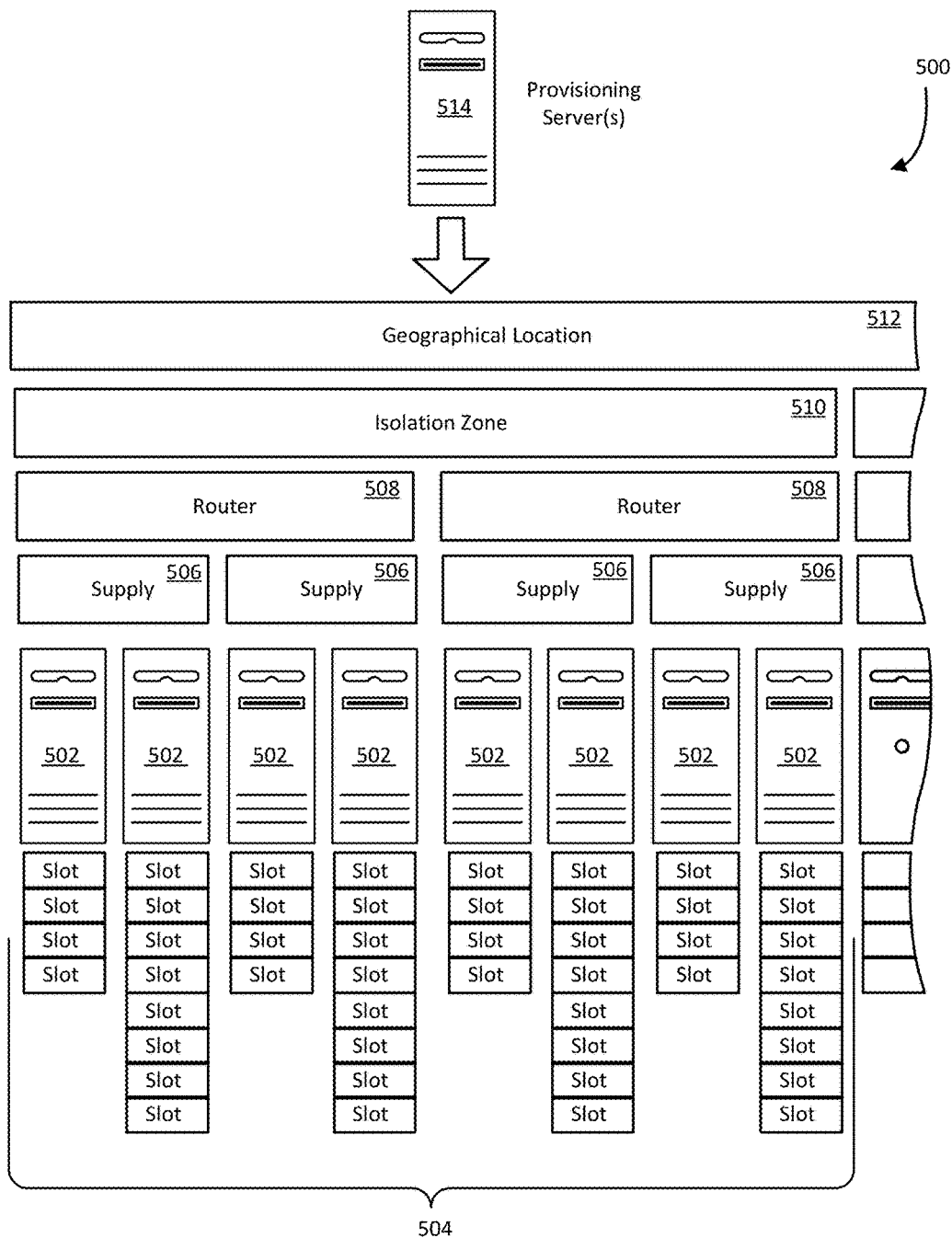
FIG. 5 is a diagram illustrating a mechanism for allocating resources in accordance with the present disclosure.

In some embodiments, such as in FIG. 5, a data center 500 may be viewed as a collection of shared computing resources and/or shared infrastructure. For example, as shown in FIG. 5, a data center 500 may include virtual machine slots 504, physical hosts 502, power supplies 506, routers 508, isolation zones 510, and geographical locations 512. A virtual machine slot 504 may be referred to as a slot or as a resource slot. A physical host 502 may be shared by multiple virtual machine slots 504, each slot 504 being capable of hosting a virtual machine, such as a guest domain. Multiple physical hosts 502 may share a power supply 506, such as a power supply 506 provided on a server rack. A router 508 may service multiple physical hosts 502 across several power supplies 506 to route network traffic. An isolation zone 510 may service many routers 508, the isolation zone 510 being a group of computing resources that may be serviced by redundant resources such as a backup generator. Multiple isolation zones 510 may reside at a geographical location 512, such as a data center 500. A provisioning server 514 may include a memory and processor configured with instructions to analyze user data and rank available implementation resources using determined roles and shared resources/infrastructure in the calculation. The provisioning server 514 may also manage workflows for provisioning and deprovisioning computing resources as well as detecting health and/or failure of computing resources.

A provisioning server 514 may determine a placement of the resource within the data center. In some embodiments, this placement may be based at least in part on available computing resources and/or relationships between computing resources. In one embodiment, the distance between resources may be measured by the degree of shared resources. This distance may be used in the ranking of resources according to role. For example, a first system on a host 502 that shares a router 508 with a second system may be more proximate to the second system than to a third system only sharing an isolation zone 510. Depending on an application, it may be desirable to keep the distance low to increase throughput or high to increase durability. In another embodiment, the distance may be defined in terms of unshared resources. For example, two slots 504 sharing a router 508 may have a distance of a physical host 502 and a power supply 506. Each difference in resources may be weighted differently in a distance calculation.

A placement calculation may also be used when selecting a prepared resource to transfer to a client account. In one embodiment, a client requests a virtual machine having an operating system. The provisioning server 514 may determine that the request may be satisfied with a staged volume in a slot 504. A placement decision may be made that determines which infrastructure may be desirable to share and which infrastructure is undesirable to share. Using the placement decision, a staged volume that satisfies at least some of the placement decision characteristics may be selected from a pool of available resources. For example, a pool of staged volumes may be used in a cluster computing setup. When a new volume is requested, a provisioning server 514 may determine that a placement near other existing volumes is desirable for latency concerns. Therefore, the decision may find that sharing a router 508 is desirable but sharing a supply 506 and physical host 502 is undesirable. A volume in the pool may then be selected that matches these attributes and placed preferably on a same router 508 as the other volumes but not the same physical host 502 or power supply 506. In other examples of placement decisions, such as those relating to a database shard, sharing of infrastructure may be less desirable and a volume may be selected that has less infrastructure in common with other related volumes.

In some embodiments, a pricing optimizer (aspects of whose functionality may be exposed to customers via programmatic interfaces, such as Web pages or a Web site) may be operable to obtain resource usage records of a customer from one or more usage data sources, and determine a recommended course of action for the customer with respect to future resource instance reservations and/or acquisitions based on the usage records and/or other pieces of information. For example, in making the recommendation, the pricing optimizer may take into account data about the customer's resource usage during earlier time periods (e.g., during the last month or the last three months) as indicated by the usage records, the pricing policies and/or current prices of different types of resources in the various resource pools and one or more optimization goals of the customer. Several different types of customer optimization goals may be taken into account in various embodiments, including, for example, customer budget limits and/or goals for a target number of available resource instances that the customer wishes to acquire. Using these various types of information, the pricing optimizer may determine a recommended number and/or types of resource instances that the customer should access over some future term and provide a notification of the recommendation to the customer.

Various types of usage data sources from which the pricing optimizer obtains usage data to develop its recommendations may be employed in different embodiments. In some embodiments, where, for example, a customer already uses some set of resource instances of the provider network, provider-side metrics agents deployed at various entities (such as resource instances, network devices, and the like) within the provider network may serve as usage data sources for the pricing optimizer. The types of usage information collected for a given resource or instance may include, for example, uptime (i.e., the amount of time a resource instance was active or booted up), CPU utilization, memory utilization, I/O rates, I/O device utilization, network traffic rates, network device utilization, the operating system in use, the hypervisor in use, various details of the software stack in use such as application server type and version, and so on, depending on the type of resource. In other embodiments, at least a portion of the usage records may be collected from customer premises or customer networks outside the provider network. For example, in one such embodiment, an entity of the provider network may allow prospective (or current) customers to download installable customer-side metrics agents, which may then be deployed to collect usage statistics from various devices (such as servers, storage devices, or network devices) within the customer's networks. The collected usage data may then be transmitted back for analysis by the pricing optimizer, which may then be able to generate recommendations for the types and number of resource instances the customer should acquire, e.g., to allow the customer to utilize the provider network's resources instead of at least some portion of the customer-side equipment.

The pricing optimizer may in one embodiment also provide recommendations for the target availability zone or zones in which a client's instances should be located. For example, the client's resource usage records may include Internet Protocol (IP) address information that allows the pricing optimizer to determine the sources and destinations of at least some of the client's network traffic, which may be useful in identifying the appropriate availability zones.

In some embodiments an interface manager (which, as noted earlier, may be incorporated within the pricing optimizer and/or a resource manager or may be external to both the pricing optimizer and resource manager) may implement a programmatic interface, which may, for example, be exposed as one or more Web pages, allowing customers to indicate optimization goals that the pricing optimizer should use when developing recommendations. Using such an interface, a customer may in one implementation indicate a resource usage budget limit, and the pricing optimizer may attempt to determine recommendations that meet the budget limit. In another scenario, a customer may indicate an instance availability count goal in some embodiments. In environments where different interruptibility settings are supported, e.g., where access to some resource instances may be revoked based on threshold conditions being reached, the pricing optimizer may also receive indications of the interruptibility preferences of a customer and use those preferences in making its recommendations. Various combinations of different types of customer optimization goals may be used in different embodiments. In one implementation, the recommendations may include performance capacity ratings for some or all of the resource instances that the customer is being advised to acquire.

In some embodiments a programmatic interface implemented for the customer may allow the customer to specify various what-if scenarios (such as anticipated or speculative resource usage metrics), and the pricing optimizer may provide recommendations based on these what-if scenarios. In one embodiment a customer may be allowed to use a programmatic interface to opt in to receive notifications if the pricing optimizer is able to find a way for the customer to save a specified amount, and the optimizer may notify the customer accordingly if the desired savings can be implemented. In another embodiment, programmatic interfaces (such as an API) may be implemented to allow third parties, such as network service companies or other intermediaries, to utilize the functionality of the pricing optimizer—e.g., to provide usage data and/or pricing/budgeting goals to the optimizer and receive corresponding recommendations. Third parties may use such facilities to help guide their own customers and/or to build their own resource management interfaces to extend the core functions supported by the pricing optimizer Various other types of services and functions may be provided by the pricing optimizer in different embodiments—e.g., the pricing optimizer may suggest instance downgrades (e.g., informing a customer that they may request a less powerful resource instance than the one for which the customer is currently paying) based on the customer's resource usage statistics, suggest a reservation resale (e.g., recommend to a customer that a long-term reservation should be listed on a reservation resale marketplace), and so on. In one embodiment, the pricing optimizer may be used to provide recommendations for reservations or allocations of execution units (such as CPU-minutes CPU-hours, floating point operations (FLOPs), and the like) instead of, or in addition to, reservations or allocations of entire resource instances.

According to one embodiment, a customer may opt-in to allow a resource manager to automatically implement one or more recommendations made by the pricing optimizer—for example, instead of, or in addition to, being notified regarding the recommendations. In one such embodiment, the customer may specify a set of resources, such as a set of reserved resources, for which the customer has approved automated recommendation-based actions. (The set of resources may be empty to begin with, i.e., in some cases the customer may utilize the resource manager to obtain all of its resource instances.) Subsequent to an indication of the opt-in by the customer for such automated actions, when the resource manager receives a relevant recommendation generated by the pricing optimizer, at least a portion of the recommendation may be put into effect, e.g., without the customer having to take any additional action. For example, if the recommendation suggests that a particular resource reservation (e.g., a slot for a reserved resource) held by the customer should be listed for resale on a reservations reselling marketplace, the resource manager may list the resource instance or reservation on the marketplace. If and when the listed resource instance is resold (e.g., when a different customer reserves the listed instance), the instance may be removed from the marketplace listing and/or from the set of resources reserved for the customer. In some cases, other events may cause a change in the status of the listed resource instance—e.g., if the instance has been listed for a while and has not yet been resold or if the pricing optimizer generates a new recommendation suggesting that it is advisable to delist the instance from the marketplace (based on pricing changes or increased resource demand from the customer). If the recommendation generated by the pricing optimizer suggests that it is advisable to procure another instance for the customer (e.g., either as a cheaper substitute for a reservation that is being resold or simply because the customer's resource demand is growing), the resource manager may identify an appropriate instance and reserve it or allocate it for the customer's use. The newly reserved or procured instance may be selected from an availability zone or region suggested in the recommendation.

The resource manager responsible for automating reservation modifications and/or other actions in accordance with recommendations generated by the pricing optimizer may be responsible for several other related functions in some embodiments. For example, the resource manager may implement one or more programmatic interfaces (such as Web pages, APIs, or command-line interfaces) allowing customers to opt-in for the automated implementation of the optimizer's recommendations, as well as one or more of the programmatic interfaces similar to those described above implementing aspects of the pricing optimizer functionality. A programmatic interface allowing customers to specify budget constraints, availability zone preferences, and the like, to be used by the pricing optimizer in generating recommendations may be implemented by the resource manager in one embodiment. In some implementations, the resource manager may provide an interface that allows a customer to specify a schedule for automated reservation optimization attempts. The customer may also indicate a scheduling preference that allows the resource manager and the pricing optimizer to control when recommendations are generated and/or implemented in some implementations—i.e., a scheduling preference that provides full flexibility for the timing of recommendation generation and implementation. In some embodiments, the full flexibility option may represent the default behavior of the system, such that restrictions on the timing of the actions of the optimizer and the resource manager may only be imposed in response to specific demands from the customer. Scheduling preferences may be communicated to the pricing optimizer by the resource manager, and the recommendations may be generated in accordance with the preferences.

Operators of provider networks, such as those described above, may, in some embodiments, provide an infrastructure such as variable capacity manager 180 depicted in FIG. 1 configured to provide customers with the ability to submit and manage variable capacity requests for computing resources such as instances. A variable capacity request may be a request for computing resources that indicates that a specified portion of the customer's reserved resources may be variable. The variable capacity request may provide, for example, the capability to allocate a percentage (e.g., from 0% to 100%) of the user's reserved computing resources or footprint for continuous rebalancing to order to provide optimization in one or more areas, such as pricing or other factors. For example, a customer may be provided the ability to allocate a portion of the customer's reserved instances to be available for rebalancing or reconfiguration by the provider network. Rebalancing or reconfiguration may comprise any one of a number of changes that may be made to a customer's reserved computing capacity such as resource type, and may be referred to as variability.

A reserved computing resource, such as a reserved instance, is provided as guaranteed capacity with associated billing benefits for the customer, such as predictability and advantageous pricing, as compared to an on-demand resource. Some customers may want to acquire reserved computing resources for the billing benefits, but may not want to be locked in to a particular configuration for the computing resource that may be selected at the time that the computing resource is reserved. For example, a customer acquiring a reserved instance may specify an instance type that may not be needed on a continuous basis.

By providing the customer with the ability to allocate a portion of the reserved computing resource as variable, the customer can allow the service provider to reconfigure the variable portion to provide greater benefit to the customer. For example, the customer may only require a portion of the customer's reserved capacity during non-peak time periods, during which the excess portion may be reconfigured as a variable portion. The service provider may modify the variable portion depending on the customer's usage patterns to provide a better pricing solution. In this way, customers have flexibility in running a computing resource that satisfies their computing requirements as needed, but allocates their unused computing capacity to provide other benefits. For example, by making the variable portion available to other resource types associated with the customer, the pricing benefits may be made available to the customer and, in some cases, may cover the billing for some of the customer's computing resources.

In one embodiment, a customer may specify the variable portion of the customer's reserved computing resource by making a selection via a mechanism such as via a user interface. The variable portion may be specified in a number of ways. For example, the variable portion may be specified in terms of a monetary amount (e.g., an amount in USD—"I authorize $100,000 of my computing resource footprint to be variable"). As another example, the variable portion may be specified by the resource count and resource type (e.g., X number of instances of type M can be variable). As another example, the variable portion may be specified by a percentage of the customer's computing resource footprint (e.g., 25% of my footprint can be variable). Other ways of specify a variable portion can be implemented such as a resource type, size, individual resource identifiers, and so on. In some embodiments, if resource identifiers are used to track resources by the service provider, the service provider may implement mechanisms to track and create/delete identifiers as the resources are updated.

In one embodiment, functionality provided on one or more systems at the service provider may be configured to monitor a customer's usage of the customer's computing resources to optimize parameters such as pricing and efficiency. For example, the customer's reserved resources and on-demand resources may be monitored, and the customer's on-demand resources that can benefit from reserved resource pricing may be identified. This may be done on a periodic basis such as hourly or daily, and the time period may be selectable by the customer.

Functionality may also be provided that matches the identified on-demand resources with a variable reserved resource. Furthermore, functionality can be provided that updates tracking and billing of the customer's resources so that the pricing benefit can be realized. By allocating a portion of the customer's resources as variable, the customer's expenses may be reduced and the service provider may be able to more efficiently allocate resources of the provider network.

The types of changes that can be made by 'the service provider to a customer's allocated variable resource capacity can include, for example, transforming the resource to another resource type or locating a virtual resource to another data center or location.

In some embodiments, a pricing optimizer as described above can be used to analyze resource usage and automatically suggest recommended changes. Typically, the pricing optimizer can generate suggested changes that can provide billing advantages to the customer based on the customer's resource utilization and can be implemented by updating various configurations for the customer's resources. In some embodiments, allowed changes to the variable portion of a reserved computing resource can be limited to changes that do not incur additional expense to the customer. In other embodiments, the customer may allow the variable portion to be changed to optimize a parameter other than cost, such as bandwidth or other parameters, with the possibility that additional costs may be incurred. The customer may be provided an option to limit the additional costs.

In some embodiments, the customer may be provided an option as to how often optimization processes, such as the pricing optimizer is executed on the customer's resources. Thus the customer may select that the optimization be performed hourly, daily, or in accordance with the current billing cycle, such as monthly. The customer may also be provided the option to allocate a portion of a resource for variable treatment as described in this disclosure at the time that the resource is requested. For example, when the customer signs up for a resource, the customer may, at that time, be provided, at a user interface, an option to specify a portion of the resource for variability. The customer may also specify a portion of the resource for variability at a later time after acquisition of the resource.

The techniques for allocating portions of computing resources for variability may be applied to any resource provided by the service provider that can be reserved and where the service provider can manage the capability to provide the reserved resource, such as computing instances, databases, storage, and so on.

Figure 6A:
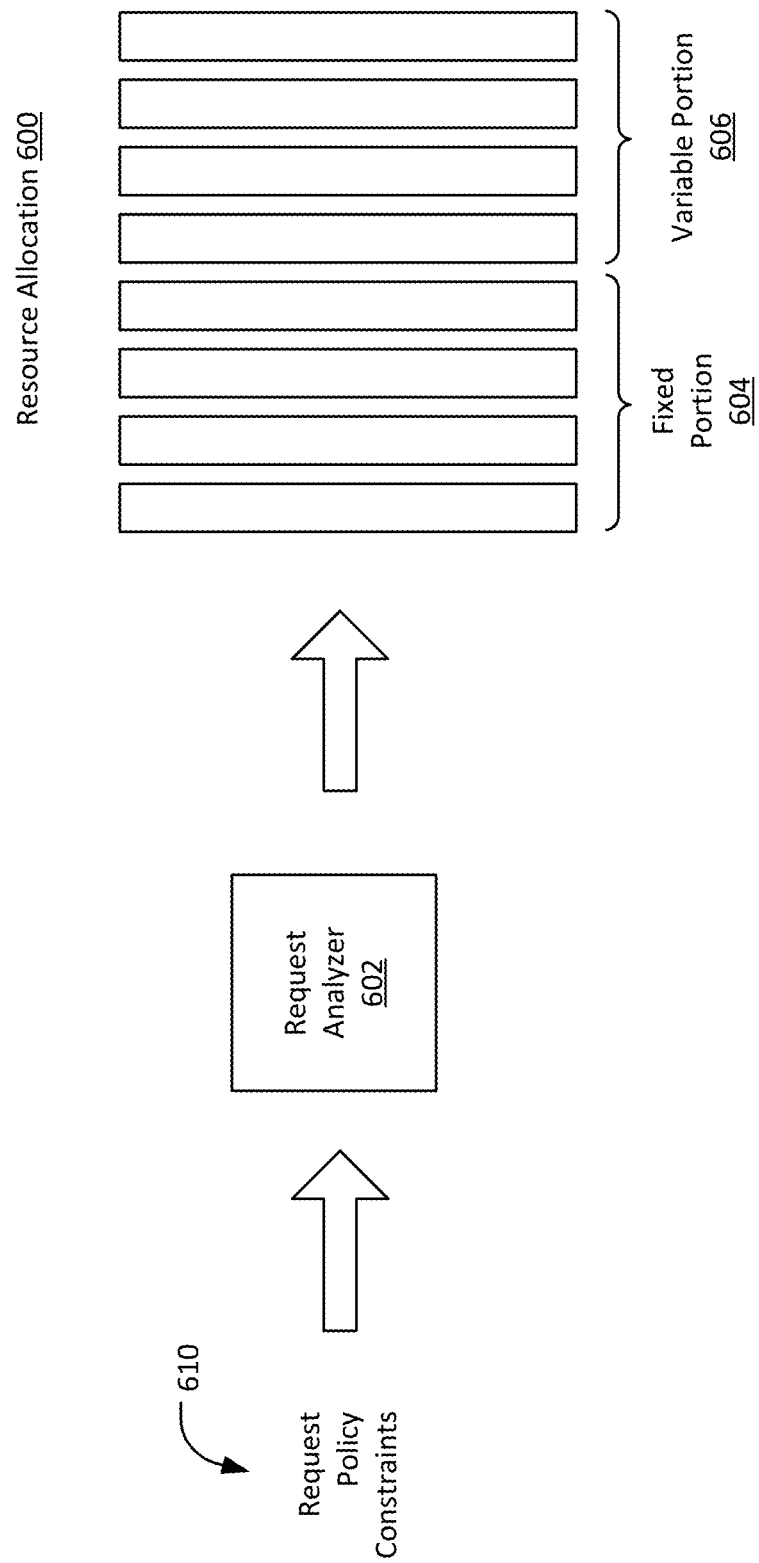
FIG. 6A is a diagram illustrating an example of allocating resources in accordance with the present disclosure.

Referring to FIG. 6A, illustrated is an example of providing variable computing resources in accordance with this disclosure. Referring to FIG. 6A, a provider network may implement a resource allocation 600 that may represent planning for allocation of computing resource slots for a customer. A provider network may maintain a plurality of such resource allocations for a plurality of customers. Resource allocation 600, in this example, may include allocations for a fixed portion 604 for a customer. Resource allocation 600 may also include allocations for a variable portion 606 for a customer. The variable capacity manager 180 in FIG. 1 implemented by the provider network may include a variable capacity request analyzer 602. The variable capacity request analyzer 602 may access data including a variable capacity request submitted by a customer. The variable capacity request analyzer 602 may access one or more policies that may define additional objectives and policies for fulfilling the variable capacity request. The variable capacity request analyzer 602 may also access constraints provided by the customer for fulfilling the request, such as a maximum price that the customer is willing to pay. In one embodiment, the variable capacity manager 180 can be embodied in software that can be installed one or more computers in the provider network.

Figure 6B:
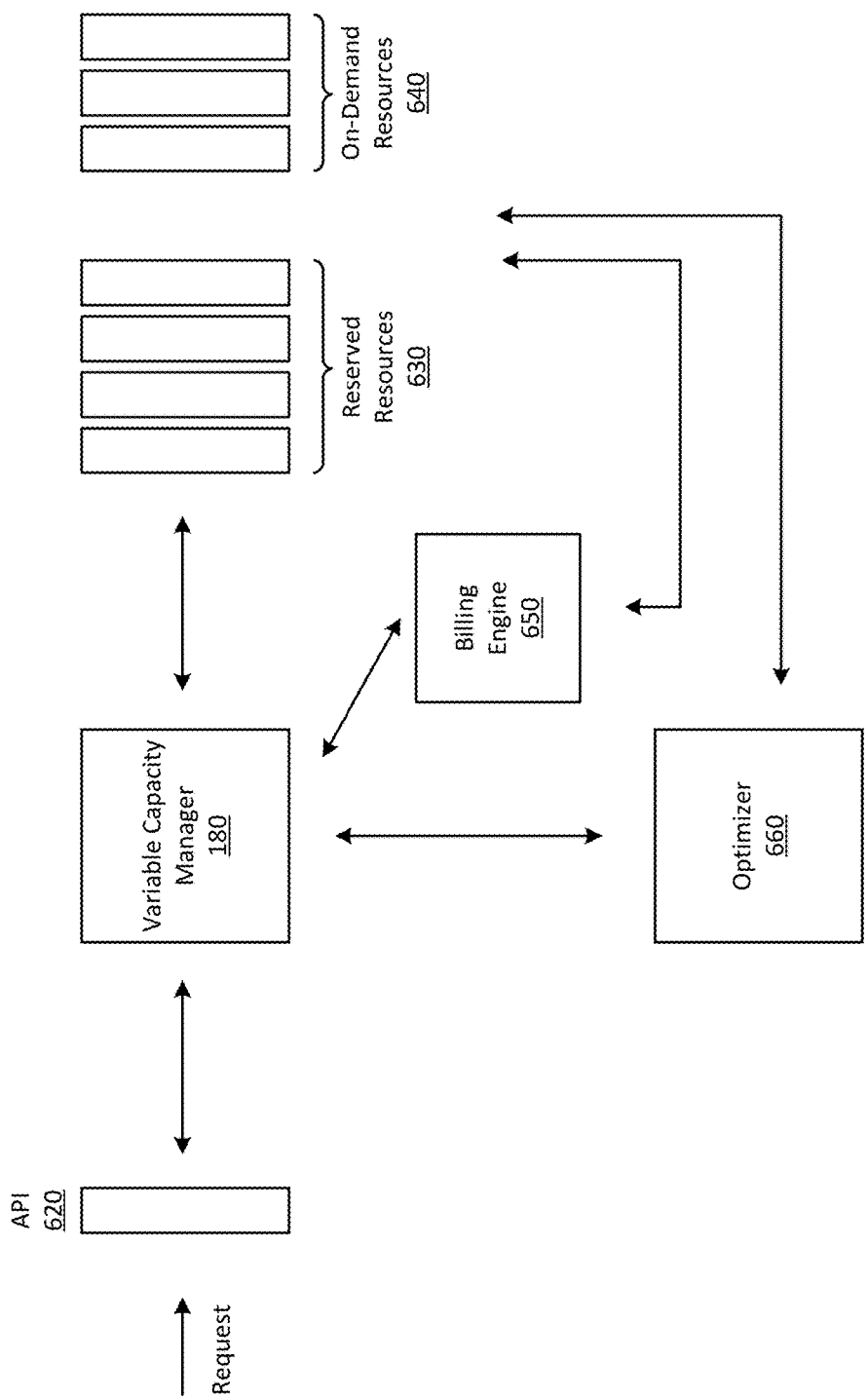
FIG. 6B is a diagram illustrating an example of allocating resources in accordance with the present disclosure.

Referring to FIG. 6B, illustrated is an example of providing variable computing resources in accordance with this disclosure. Referring to FIG. 6B, a provider network may implement an API 620 that is configured to received requests for variable reserved resources. Requests may be managed by variable capacity manager 180 that may communicate with one or more systems in the provider network to allocate reserved resources 630 and on-demand resources 640.

Variable capacity manager 180 may also interact with billing engine 650 and optimizer 660 to analyze the allocated reserved resources 630 and on-demand resources 640 and determine if pricing and other benefits may be provided. Optimizer 660 may analyze various parameters, such as input/output operations, reads/writes, CPU utilization, memory usage, and the like. Based on the analysis, optimizer 660 may identify modifications that may be implemented on a customer's variable computing resources. For example, optimizer 660 may recommend changes to an instance type. Implementation of the changes may provide improvements to latency, work time, pricing, and other parameters.

Utilizing the technologies described above, a provider network may implement the variable capacity manager 180 to allow customers to request variable computing resources. The request or bid may also include a desired pricing level that the customer is willing to pay to fulfill the request or bid. Customers may provide other parameters to further describe the customer's computing needs and to further optimize fulfillment of the request. In this way, a customer need not determine and commit to customer's computing needs in terms of specific configurations of the provider network's available resources.

By providing such a variable capacity manager for requesting resources, the provider network can provide the resources by efficiently fulfilling the customer's request using available resources that meet the customer's requirements while providing enhanced pricing and efficient performance. This can also allow the provider network to more efficiently allocate its resources while allowing the customer to more easily maximize the customer's computing capacity and lower the prices that the customer pays for the computing capacity. By using such a variable capacity manager, a customer can avoid the need to continuously acquire other resource types as computing needs change. The customer may instead, using the variable capacity manager, submit a single request that specifies a target core portion to cover fixed needs and a variable portion that can be changed to flexibly provide pricing benefits. The provider network can automatically process the request to maximize efficiency while remaining within the customer's pricing expectations. By allowing the provider network to flexibly provide available resources, such a customer may be able to maximize the amount of computing capacity for a given cost constraint without the need to be concerned with obtaining more capacity than the customer needs.

To provide an illustrative example, a customer may submit a request for a capacity of 1,000 computing units. The customer may also specify that 50% of the request may be variable. The provider network may reserve capacity for 1,000 computing units, and mark 500 computing units as variable. The provider network may maintain the fixed capacity of 500 computing units and allow the other 500 variable computing units to be modified based on analysis of the customer's usage.

The provider network may process a variable capacity request using one or more processes for determining how to fulfill the request using the specified constraints. In some embodiments, a pricing optimizer as described above may be used to evaluate a customer's usage and task completions and re-evaluate weights. Such a pricing optimizer can measure task flow rates and provide recommendations for lowering cost.

Figure 7:
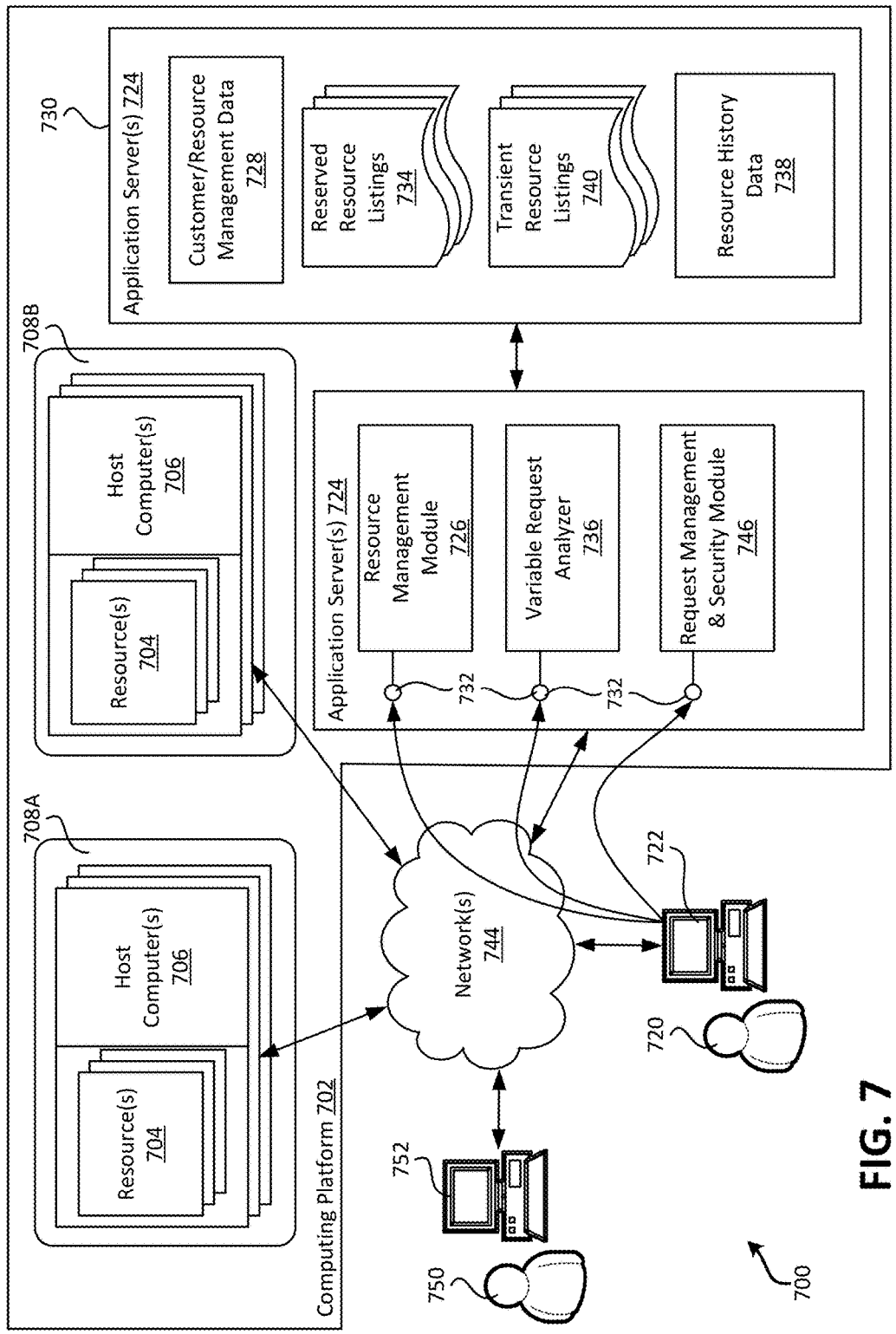
FIG. 7 is a diagram illustrating a system for allocating resources in accordance with the present disclosure.

FIG. 7 is a system diagram that shows an illustrative operating environment 700 including several components for implementing a variable capacity manager. The environment 700 may include a computing platform 702. The computing platform 702 may be implemented by a computing resource provider to make computing resources available to customers 720 for the deployment and execution of distributed applications.

The computing resources provided by the computing platform 702 may include various classes of resources, such as data processing resources, data storage resources, data communication resources, and the like. Each class of computing resource may be general-purpose or may be available in a number of specific configurations. For example, data processing resources provided by the computing resource provider may be made available in discrete units or resources 704. Each resource 704 may represent, for example, the data processing resources of a dedicated host computer 706, referred to as a dedicated tenancy instance, or each resource 704 may represent a virtual machine instance executing on a host computer 706, which may also be referred to as a shared tenancy instance.

The host computers 706 may represent generic multiprocessor server devices, special purpose hardware devices, and the like. As discussed above, various types and configurations of resources 704 may be made available. For example, each available resource 704 of data processing resources may be of a particular size—such as small, medium, and large—representing different combinations of physical and/or virtual resources comprising or allocated to the resources, such as number and types of processors, amounts of memory, size and speed of local storage, number of networking addresses or communication channels, and/or the like. A resource 704 may further be configured with a particular platform, such as a specific OS and/or hypervisor installed on the instance. Resources 704 may also be made available with specific application software components installed, such as Web server software, database management software, portal software, a specific runtime environment or platform, and the like.

Resources may further be available in specific availability zones 708A and 708B, as described above. As discussed above, an availability zone 708 may represent a particular physical location, such as a data center or other physical and/or logical grouping of underlying host computers 706 and computing devices supporting the instances 704 provided by the computing platform 702. Providing resources 704 in different sizes and in different availability zones 708 may allow a deployed application to be geographically dispersed, improving end-user performance and insulating the overall application from failures in one particular location or zone. For example, a customer 720 may choose to deploy a number of small resources 704 across multiple availability zones 708 for some functions of the application, such as Web servers, while deploying a single, large resource 704 for other functions, such as a database server, for example. The customer 720 may also require that resources 704 be hosted by host computers 706 in particular geographical locations for geopolitical reasons.

End-users 750 may utilize end-user computer systems 752 to access the functionality of the application executing on the allocated instances 704 through one or more networks 744. The network(s) 744 may represent a combination of local-area networks (LANs), wide-area networks (WANs), the Internet, and/or any other networking infrastructure known in the art that connects the host computers 706 in the computing platform 702 to the end-user computer systems 752, to each other and to other computing resources. The end-user computer systems 752 may represent personal computers (PCs), desktop workstations, laptops, notebooks, personal digital assistants (PDAs), electronic-book readers, game consoles, set-top boxes, consumer electronics devices, server computers, or any other computing device capable of connecting to the network(s) 744 and communicating with the host computers 706 in the computing platform 702.

A customer 720 wishing to access resources on the computing platform 702 may similarly utilize a customer computer system 722 to connect the computing platform over the network(s) 744 and to configure and manage the computing resources provided by the computing platform. In this regard, the computing platform 702 may include a number of application servers 724 that provide various management services to the customer 720 for purchasing and maintaining resources 704 of data processing and/or other computing resources, deploying components of the application across the purchased resources 704, monitoring and administering execution of the application and the like. As in the case of the end-user computer systems 752, the customer computer systems 722 may represent PCs, desktop workstations, laptops, notebooks, PDAs, electronic-book readers, game consoles, set-top boxes, consumer electronics devices, server computers, or any other computing device capable of connecting to the network(s) 744 and communicating with the application servers 724 in the computing platform 702.

The application servers 724 may represent standard server computers, database servers, Web servers, network appliances, desktop computers, other computing devices, and any combination thereof. The application servers 724 may execute a number of modules in order to provide the management services. The modules may execute on a single application server 724 or in parallel across multiple application servers in the computing platform 702. In addition, each module may consist of a number of subcomponents executing on different application servers 724 or other computing devices in the computing platform 702. The modules may be implemented as software, hardware, or any combination of the two.

The application servers 724 may execute an instance management module 726. The instance management module 726 may allow customers 720 to purchase and configure resources 704 of data processing or other computing resources, manage and maintain purchased resources 704, and the like. Resources 704 may include resources that may be obtained through various modes, such as reserved resources, transient resources, and on-demand resources as described above. Purchased resources 704 for each customer 720 and corresponding configuration and status information may be stored in customer/resource management data 728. The customer/resource management data 728 may be stored in a database 730 or other data storage system available to the application server(s) 724 in the computing platform 702.

Reserved resources provide the customer with the ability to reserve a number of a specific type and configuration of resources for a term, such as one year or three years. The reserved resources may represent actual instances of data processing resources configured as specified and placed in stand-by for launch and deployment by the customer 720 at a future time, or the reserved resources 704 may represent overall capacity reserved by the computing resource provider for quick configuration and launch when required. When deploying an application, a customer 720 may purchase and launch a number of on-demand resources 704 of a specific type and configuration (e.g., size, platform, tenancy, availability zone, and the like) to support immediate availability of the application, as well as a number of reserved resources of the same or similar type and configuration for scaling up the application in the future in response to increased demand or capacity requirements of the application, for example.

A customer 720 may utilize a Web browser application executing on the customer computer system 722 to access a user interface presented by the resource management module 726 through a Web service to perform the configuration and maintenance of the customer's purchased resources 704. The customer 720 may also utilize a Web browser application executing on the customer computer system 722 to access a user interface presented by the request management and security module 746 through a Web service to purchase, sell, or trade options as discussed above. Additionally or alternatively, the resource management module 726 or request management and security module 746 may expose an application programming interface (API) 732, which may be accessed over the network(s) 744 by stand-alone application programs executing on the customer computer system 722. Other mechanisms for accessing the configuration and maintenance services of the resource management module 726 or request management module and security 746 may also be imagined, including remote procedure calls, SOAP-based Web services, remote file access, proprietary client-server architectures, and the like.

In some embodiments, the resource management module 726 may allow customers 720 to purchase both on-demand resources and reserved resources. On-demand resources may be purchased and launched immediately, allowing for quick deployment of the components of the application. On-demand resources may further be added or removed as needed, either manually or automatically through auto scaling, as demand for or capacity requirements of the application changes over time. The customer 720 may incur ongoing usage costs related to their on-demand resources, based on the number of hours of operation of the instances 704 and/or the actual resources utilized, for example.

A customer 720 may determine that in addition to their purchased resources 704, the customer 720 may want to purchase computing capacity with the pricing benefits of reserved resources, but without committing the entirety of the computing capacity to a particular configuration. The customer 720 may submit a request that includes one or more parameters sufficient for variable request analyzer 736 to determine quantities and type(s) of resources that will fulfill the customer's computation needs.

The variable request analyzer 736 may access the reserved resource listings 734 and transient resource listings 740 in the database 730 to determine availability and pricing data for the estimated quantity and type(s) of instance that will fulfill the customer's computation needs. For example, variable request analyzer 736 may determine instance type and configuration requirements (e.g., size, platform, tenancy, availability zone, and the like).

The application servers 724 may execute a request management and security module 746. The request management module and security 746 may facilitate the allocation of the resources determined by variable request analyzer 736. The request management module and security 746 may allow also customer 720 to view status of the customer's resources and requests. The customer 720 may utilize a Web browser application executing on the customer computer system 722 to access a user interfaces (UI) presented by the request management module and security 746 through a Web service to browse for pending requests and make changes. Additionally or alternatively, the request management module and security 746 may expose an API 732, which may be accessed over the network(s) 744 by stand-alone application programs executing on the customer computer system 722.

The request management module and security 746 may further store data records regarding submitted and fulfilled requests in the resource history data 738 in the database 730 or other data storage system. The resource history data 738 may be utilized by customer 720 or the computing resource provider to record billing data regarding fulfilled requests.

Figure 8:
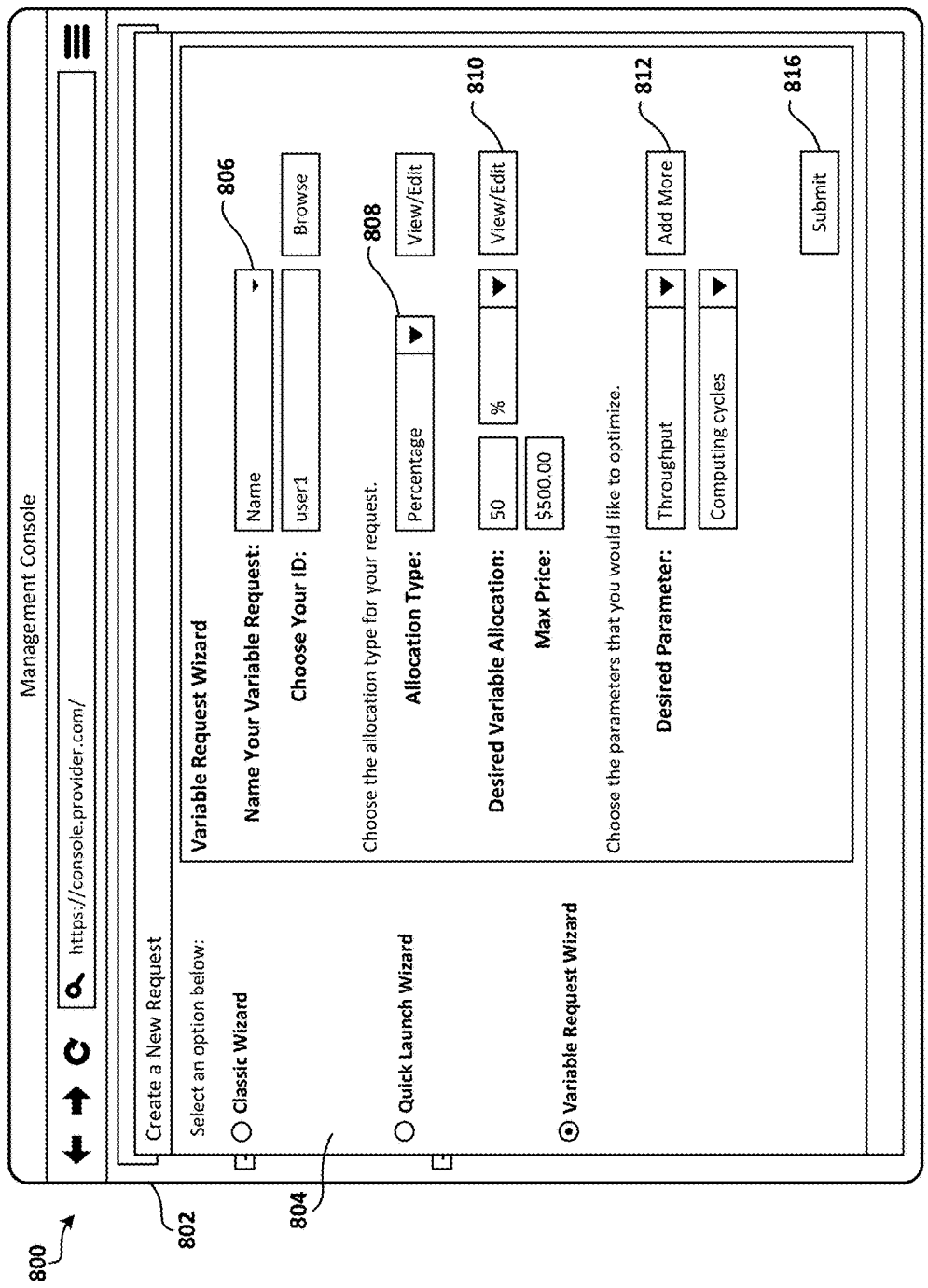
FIG. 8 is a diagram illustrating an example user interface in accordance with the present disclosure.

As discussed, the user can be provided a user interface for submitting a variable capacity request. For example, the user may be able to access a user interface such as the one shown in FIG. 8. In one embodiment, a customer may utilize a user interface presented by the request management module and security 746 of FIG. 7 to submit a variable capacity request. For example, as shown in FIG. 8, the request management and security module 746 or another module in the computing platform 702 may present the user interface 800 to the customer 720 in a window 802 of a Web browser or other client application executing on the customer computer system 722. The user interface 800 may include a template for creating/submitting a new request 804 listing the parameters of a request that the user may submit. The request form 804 may include a request name 806, allocation type 808, allocation amount 810, optimization parameters 812, and the like. Allocation type 808 may be used to allow a customer to allocate a specified portion of the customer's resources as variable. The customer may be allowed to select one of a plurality of parameters to specify the variable portion, such as percentage, overall footprint, monetary value, and other parameters. The customer may also be allowed to input optimization parameters 812 that provide input to the service provider that the variable portion can be modified to optimize these parameters. In some embodiments, the customer may also be able to specify which aspects of the variable portion can be changed (e.g., instance type, instance size, etc.). These fields are provided to illustrate examples of possible user interface options that may be provided to a customer. As further described herein, additional fields may be provided, and some of the fields may be optional.

The user interface 800 may further include a selection user interface control, such as the user interface control 816 shown in FIG. 8 that allows the customer 720 to proceed with the currently entered parameters.

Figure 9:
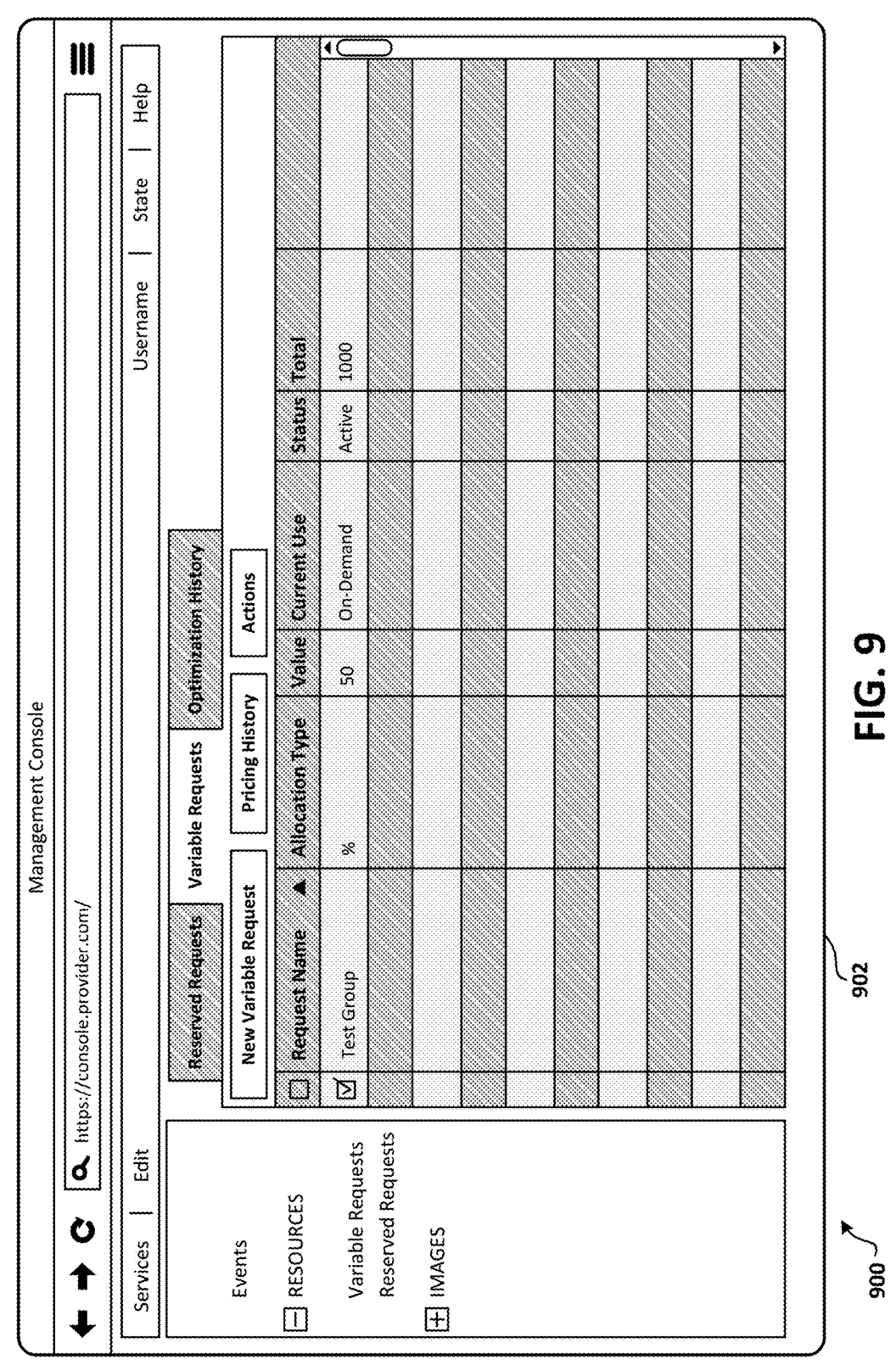

After selection of a control to submit a variable capacity request, variable request analyzer 736 may receive information for the parameters for the variable capacity request. For example, after selecting the user interface control 816 in the user interface 800 shown in FIG. 8, the request management module and security 746 or another module in the computing platform 702 may present the user interface 900 to the customer 720, as shown in FIG. 9. The user interface 900 may be presented in the window 902 of a Web browser or other client application executing on the customer computer system 722, for example. The user interface 900 may include a summary of the variable capacity requests submitted by the customer. The user interface 900 may allow the customer 720 to review data, such as pricing and optimization actions that have been taken.

In some embodiments, an API may be provided for facilitating the submission of variable capacity requests. The API may be configured to receive electronic messages that encode identifiers indicative of variable capacity requests for fulfillment by the provider network. In response to receiving one of the electronic messages, the API may send second electronic messages indicative of information indicating that a variable capacity request has been received or has been allocated to the customer. An API may also be provided that can facilitate exchange of data with applications that may provide information for submitting variable capacity requests. For example, an API may receive parameter data from third-party applications that may perform customer scheduling and task management functions.

Figure 10:
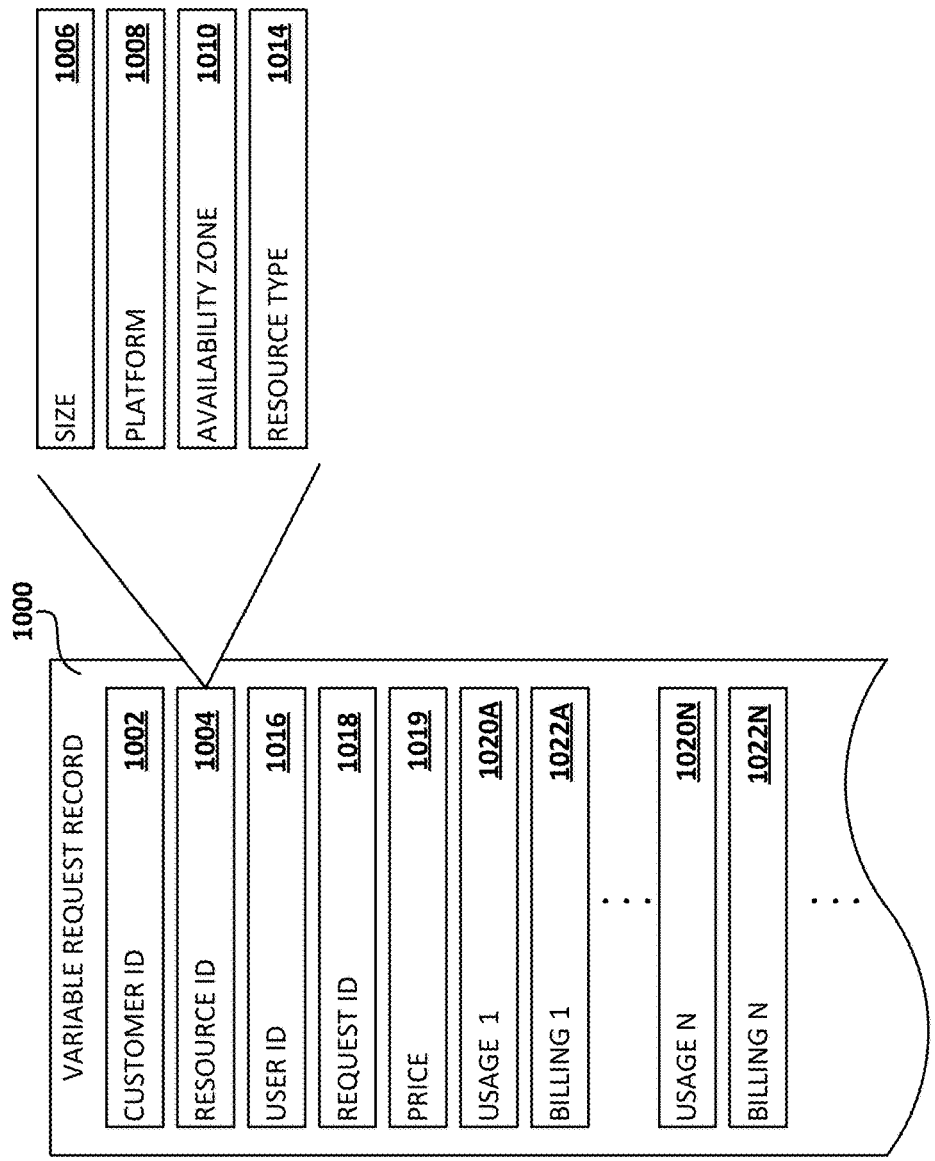
FIG. 10 is a diagram illustrating an example data record in accordance with the present disclosure.

FIG. 10 is a data structure diagram showing a number of data elements stored in a variable request record 1000. It will be appreciated by one skilled in the art that the data structure shown in the figure may represent a data file, a database table, an object stored in a computer memory, a programmatic structure, or any other data container commonly known in the art. Each data element included in the data structure may represent one or more fields in a data file, one or more columns of a database table, one or more attributes of an object, one or more member variables of a programmatic structure, or any other unit of data of a data structure commonly known in the art. The implementation is a matter of choice and may depend on the technology, performance and other requirements of the computing system upon which the data structures are implemented.

The variable capacity request record 1000 may contain a customer ID 1002 identifying the customer 720 of the computing platform 702 that has submitted the request. According to one embodiment, the variable capacity request record 1000 may also contain a resource ID 1004 field identifying one or more specific resources that may be associated with a variable capacity request. The resource ID 1004 may correspond to information regarding the resources stored in the customer/resource management data 728, for example.

In some embodiments, the variable capacity request record 1000 may additionally or alternatively contain information regarding the type and configuration parameters describing the associated resource(s) 1004, including the size 1006, platform 1008, availability zone 1010, resource type 1014, and the like. The variable capacity request record 1000 may include multiple entries or pointers to other records in the case of multiple resources. The variable capacity request record 1000 may also contain a user ID 1016 indicating an identification of a particular user associated with the record. The user ID 1016 may correspond to the identifier information provided by the customer 720 when creating the variable capacity request, as described above with regard to FIG. 8.

The variable capacity request record 1000 may also contain information regarding a request ID 1018 corresponding to the variable capacity request and price 1019 that corresponds to the maximum amount that the customer wants to pay for the request. The variable capacity request record 1000 may further contain information regarding one or more usage records 1020A-1020N (also referred to herein generally as "usage 1020") and billing records 1022A-1022N (also referred to herein generally as "billing 1022"). As further discussed above in regard to FIG. 8, a user may access a variable capacity request after successfully obtaining fulfilling of the request. Billing records 1022A-1022N for usage 1020A-1002N may be tracked for the customer for billing purposes. It will be appreciated that the variable capacity request record 1000 may contain additional data elements beyond those shown in FIG. 10 and described above that are utilized by the instance management module 726, the instance listings module 736 and/or other modules of the computing platform 702 implementing the private marketplace.

In additional embodiments, the instance management module 726 or other modules in the computing platform 702 may provide user interfaces or APIs 732 to the customer 720 and/or customer computer system 722 that allow the customer to modify their variable capacity request, check the status of the variable capacity request record and/or to delete the variable capacity request record if it is no longer desired to provide the computing capacity using the variable capacity manager.

Figure 11:
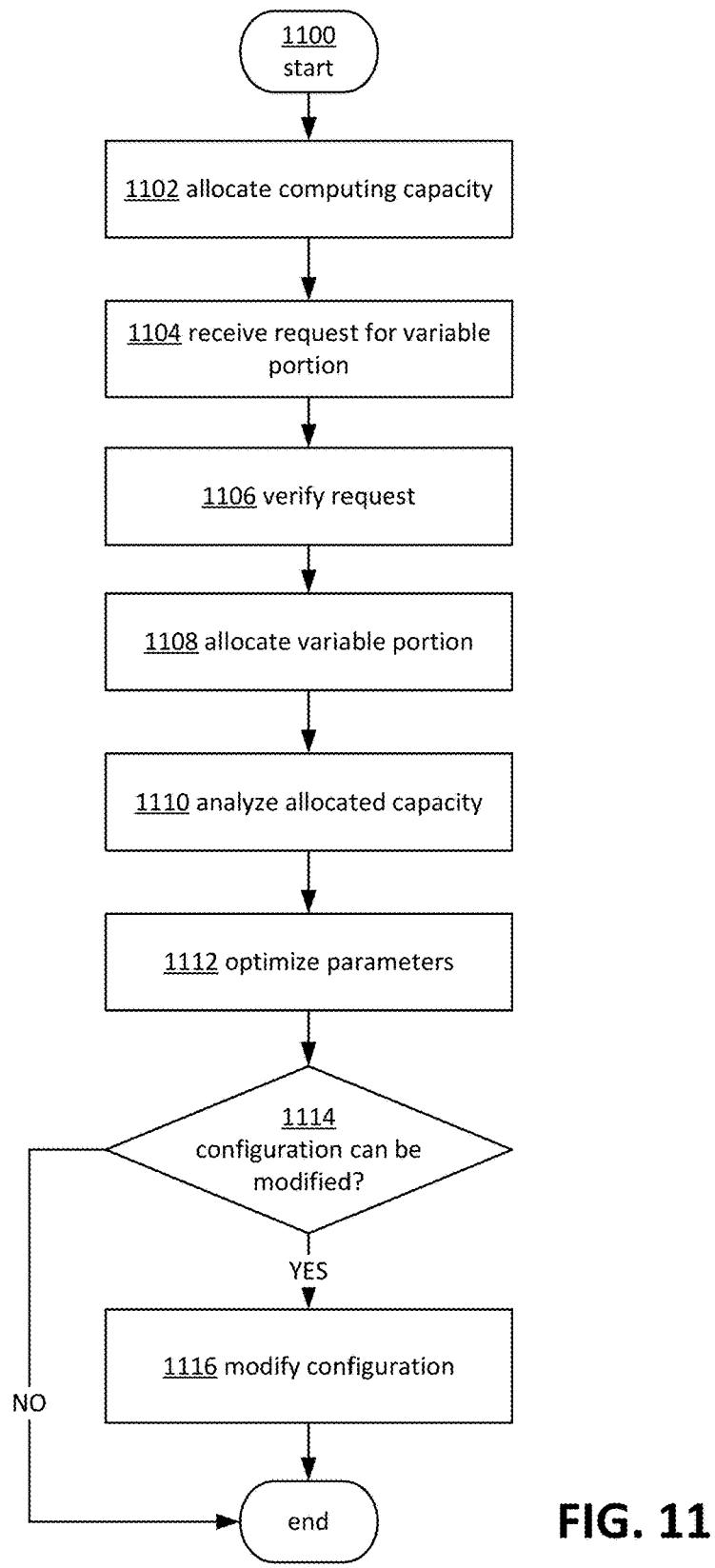
FIG. 11 is a flowchart depicting an example procedure for allocating resources in accordance with the present disclosure.

FIG. 11 illustrates an example operational procedure for allocating computing resources to customers of a multi-tenant web services platform. In an embodiment, a mechanism for allocating computing resources can be provided by services, such as variable capacity manager 180 in FIG. 1. The operational procedure may be implemented in a system comprising one or more computing devices. In one embodiment, the system may comprise a data center. The one or more computing devices may comprise one or more processors. Referring to FIG. 11, operation 1100 begins the operational procedure. Operation 1100 may be followed by operation 1102. Operation 1102 illustrates allocating capacity to fulfill a request for one or more computing resources to a customer.

Operation 1102 may be followed by operation 1104. Operation 1104 illustrates receiving, from a customer, a request comprising one or more parameters indicative of a portion of the allocated capacity that is subject to variability or modification. In one embodiment, the multi-tenant web services platform may be allowed to modify a configuration of the portion of the allocated capacity in accordance with at least one criterion without modifying a remaining portion of the allocated capacity that is not subject to variability. In some embodiments, the one or more parameters may be indicative of one of a percentage of the allocated capacity, a cost associated with the allocated capacity, and a type and quantity of the one or more computing resources.

Operation 1104 may be followed by operation 1106. Operation 1106 illustrates verifying that the customer is authorized to submit the request. Operation 1106 may be followed by operation 1108. Operation 1108 illustrates allocating or designating the variable portion of the allocated capacity.

Operation 1108 may be followed by operation 1110. Operation 1108 illustrates analyzing the allocated capacity and the requested computing resources in accordance with the at least one criterion. Operation 1110 may be followed by operation 1112. Operation 1108 illustrates optimizing one or more parameters based on the analysis of the allocated capacity. Operation 1112 may be followed by operation 1114. Operation 1114 illustrates determining that the configuration of the portion of the allocated capacity can be modified. If the configuration of the portion of the allocated capacity can be modified, then operation 1114 may be followed by operation 1116—which illustrates modifying at least one aspect of the configuration of the portion of the allocated capacity based at least in part on the analysis of the allocated capacity. In some embodiments, billing for the allocated capacity may be adjusted based on the modified at least one aspect.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system configured to allocate computing resources to customers of a multi-tenant web services platform, the system comprising:
   at least one memory having stored therein computer instructions that, upon execution by one or more processors of the system, at least cause the system to:
   allocate capacity to provide one or more computing resources to a customer;
   receive, from the customer, a request to make a portion of the allocated capacity subject to variability, the request comprising information indicative of the portion of the allocated capacity and at least one criterion, wherein the multi-tenant web services platform modifies, in response to the request, a configuration of the portion of the allocated capacity, in accordance with the at least one criterion, to make the allocated capacity subject to variability without modifying a remaining portion of the allocated capacity that is indicated by the request to not be subject to variability;
   analyze the allocated capacity and the requested computing resources in accordance with the at least one criterion; and
   modify at least one aspect of the configuration of the portion of the allocated capacity based at least in part on the analysis of the allocated capacity and in accordance with the at least one criterion.

2. The system according to claim 1, wherein the information indicative of the portion of the allocated capacity that is subject to variability comprises information indicative of at least one of a percentage of the allocated capacity, a cost associated with the allocated capacity, a type and quantity of the one or more computing resources, or one or more internal identifiers.

3. The system according to claim 1, further comprising computer instructions that, upon execution by one or more processors of the system, at least cause the system to adjust billing for the allocated capacity based on the modified at least one aspect.

4. A computer-implemented method for providing computing resources of a multi-tenant web services platform, the method comprising:
   receiving, from a customer, a request to allocate a subset of the customer's reserved computing resource capacity as modifiable, wherein the multi-tenant web services platform is allowed to modify the subset in accordance with at least one criterion included in the request without modifying a remaining portion of the customer's reserved computing resource capacity that is indicated by the request to not be subject to variability;
   analyzing the subset in accordance with the at least one criterion; and
   modifying the subset based at least in part on the analysis of the subset.

5. The method of claim 4, wherein the request comprises a quantity and type of computing resource.

6. The method of claim 4, wherein the request comprises a percentage of the allocated capacity.

7. The method of claim 4, wherein the request comprises a cost associated with the allocated capacity.

8. The method of claim 4, wherein the computing resource comprises one or more of a computer processing resource or a memory resource.

9. The method of claim 4, wherein the customer's reserved computing resource capacity comprises capacity to run a reserved computing instance.

10. The method of claim 4, wherein the at least one criterion comprises at least one of price and performance.

11. The method of claim 4, wherein the request is received via an application programming interface (API).

12. The method of claim 4, further comprising adjusting billing for the customer's reserved computing resource capacity based on the modified subset.

13. The method of claim 4, further comprising allocating the subset of the customer's reserved computing resource capacity for use by other requests for computing resources by the customer.

14. The method of claim 13, further comprising adjusting billing for the other requests based on pricing for the subset of the customer's reserved computing resource capacity.

15. The method of claim 4, wherein said analyzing comprises running an optimization function configured to generate recommendations for cost improvement based on the subset and in accordance with the at least one criterion.

16. The method of claim 15, wherein a frequency for running the optimization function is selectable by the customer.

17. A non-transitory computer-readable storage medium having stored thereon computer-readable instructions, the computer-readable instructions comprising instructions that upon execution on one or more computing devices, at least cause the one or more computing devices to:

generate a first interface allowing a customer of a multi-tenant web services platform to submit a request to allocate a subset of the customer's reserved computing capacity as convertible by the multi-tenant web services platform, the subset being modifiable in accordance with at least one criterion without modifying a remaining portion of the customer's reserved computing resource capacity, wherein the request comprises the at least one criterion and information indicative of the subset of reserved computing capacity that is modifiable; and modify the subset based at least in part on analysis of the subset in accordance with the at least one criterion.

18. The non-transitory computer-readable medium of claim 17, further comprising instructions that upon execution on one or more computing devices, at least cause the one or more computing devices to generate a second user interface allowing the customer to receive a status of the request.

19. The non-transitory computer-readable medium of claim 17, wherein the subset is indicated by one of a percentage of the allocated capacity, a cost associated with the allocated capacity, and a type and quantity of one or more computing resources of the reserved computing capacity.

20. The non-transitory computer-readable medium of claim 17, further comprising instructions that upon execution on one or more computing devices, at least cause the one or more computing devices to adjust billing for the customer's reserved computing capacity based on the modified subset.

* * * * *